J. Andrews,
Grinding Saws.

N° 30,190.        Patented Oct. 2, 1860.

Witnesses:
N. P. Fassett
Joseph Burbage

Inventor:
John Andrews

UNITED STATES PATENT OFFICE.

JOHN ANDREWS, OF ELMIRA, NEW YORK.

GRINDING CIRCULAR SAWS.

Specification of Letters Patent No. 30,190, dated October 2, 1860.

*To all whom it may concern:*

Be it known that I, JOHN ANDREWS, of Elmira, Chemung county, State of New York, have invented a new and Improved Mode of Grinding Circular Saws; and I do hereby declare that the following is a full and exact description thereof, reference being had to the accompanying drawings and to the letters of reference marked thereon.

Figure 1:
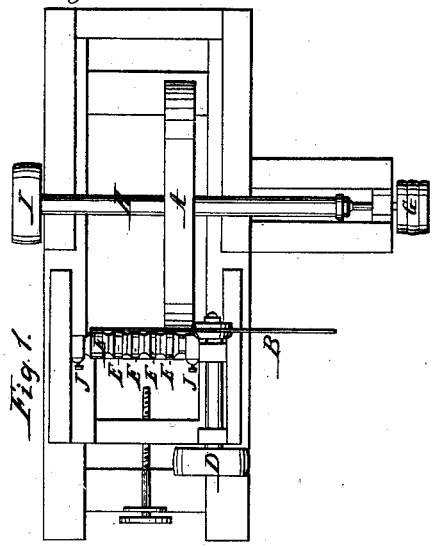
Figure 2:
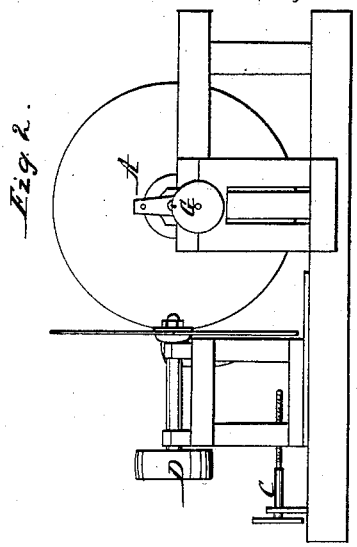
Figure 4:
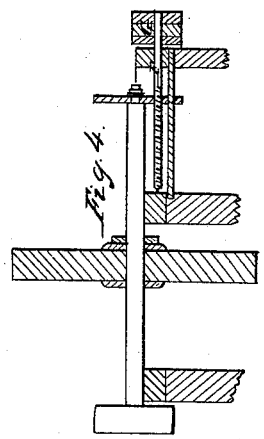
Figure 3:
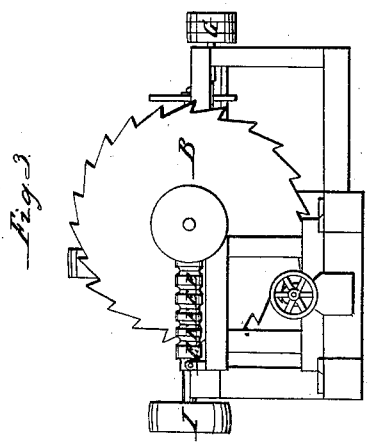

Figure 1, is a ground plan of my machine representing the application of the grindstone A, to the saw B. Fig. 2, represents a side view of my machine, showing the manner of applying the saw B, to the grindstone A, by means of the set screw C, worked by hand, back and forth on a slide. Fig. 3, represents an end view of my machine, showing the application of the rollers E, E, and c, to the saw pressing it upon the grindstone. Fig. 4, represents a section showing the manner in which the grindstone is made to traverse by means of the screw F, attached to the three pulleys G, and moved by a double belt.

To enable others skilled in the art to make and use my invention, I will proceed to describe its construction and operation.

I prepare a substantial frame, as in Fig. 1, in a part of which I hang a grindstone A, upon an iron shaft H, which traverses from the center of the saw to the circumference and which is set in motion by means of the pulley I. I then prepare a frame as described by the left part of Fig. 2, to which is attached the saw and rollers E, E, E, and c. The saw to be ground is hung firmly upon an iron shaft, which is set in motion by the pulley D. This frame with the saw attached is then placed upon slides, on the bed pieces of the frame represented by Fig. 1, and is then moved by the hand screw C, to and from the grindstone. I then prepare anti-friction rollers E, E, E, &c., in separate pieces and place them upon a shaft, so that they can be removed at pleasure, as the diameter of the saw may require always placing a wide one against the teeth of the saw. These rollers are forced against the saw by means of the set-screws J, J, in Fig. 1, which rollers thus applied enable the operator to grind the saw at a taper or at an even thickness, as may be required. When the machine is in motion the saw revolves one way and the stone the other.

What I claim as my invention, and desire to secure by Letters Patent, is—

1. The antifriction rollers E when arranged in the manner herein set forth, for the purpose specified.

2. The manner of presenting the saw to the stone by means of a separate frame resting on a slide and moved by the set screw C.

JOHN ANDREWS.

Witnesses:
  N. P. FASSETT,
  JOSEPH BURBAGE.